United States Patent
Long

(10) Patent No.: US 10,344,414 B2
(45) Date of Patent: Jul. 9, 2019

(54) SEPARATION, RECYCLING AND SELF-CLEANING SYSTEM OF SUPERCRITICAL FLUID DYEING MACHINE

(71) Applicants: NANTONG TEXTILE & SILK INDUSTRIAL TECHNOLOGY RESEARCH INSTITUTE, Nantong, Jiangsu (CN); SOOCHOW UNIVERSITY, Suzhou (CN)

(72) Inventor: Jiajie Long, Suzhou (CN)

(73) Assignees: NANTONG TEXTILE & SILK INDUSTRIAL TECHNOLOGY RESEARCH INSTITUTE, Nantong (CN); SOOCHOW UNIVERSITY, Suzhou (CN)

( * ) Notice: Subject to any disclaimer, the term of this patent is extended or adjusted under 35 U.S.C. 154(b) by 193 days.

(21) Appl. No.: 15/557,106

(22) PCT Filed: Jun. 8, 2016

(86) PCT No.: PCT/CN2016/085186
§ 371 (c)(1),
(2) Date: Sep. 10, 2017

(87) PCT Pub. No.: WO2017/206196
PCT Pub. Date: Dec. 7, 2017

(65) Prior Publication Data
US 2018/0119324 A1    May 3, 2018

(30) Foreign Application Priority Data
May 30, 2016    (CN) .......................... 2016 1 0368949

(51) Int. Cl.
*D06B 23/20*    (2006.01)
*D06P 1/81*    (2006.01)
(Continued)

(52) U.S. Cl.
CPC ......... *D06B 23/20* (2013.01); *B01D 46/0068* (2013.01); *B01D 46/54* (2013.01);
(Continued)

(58) Field of Classification Search
CPC ........ D06B 23/14; D06B 23/20; D06B 23/30; D06B 9/02; D06B 9/06; D06B 19/00;
(Continued)

(56) References Cited

U.S. PATENT DOCUMENTS 3,871,821 A * 3/1975 Winn ........................ D06B 9/02
                                                8/149.1
5,666,827 A * 9/1997 Gunter ................... D06B 23/20
                                                 68/27
(Continued)

FOREIGN PATENT DOCUMENTS

CN         1766194 A       5/2006
CN       101021047 A       8/2007
CN       104609605 A       5/2015

*Primary Examiner* — Joseph L. Perrin
(74) *Attorney, Agent, or Firm* — SZDC Law P.C.

(57) ABSTRACT

The invention relates to a separation, recycling and self-cleaning system of a supercritical fluid dyeing machine. The system includes a supercritical fluid medium reservoir, one or more parallel dyeing units, a high-pressure pump, a primary separator, a secondary separator and a membrane separator sequentially connected. A dyeing medium and residual dye in dyeing units can be efficiently separated and recycled simultaneously, and when the separation and recycling is finished, each dyeing unit can be directly opened so that the dyeing units and products can be cleaned after dyeing, thereby improving the production and processing efficiency of supercritical fluid waterless dyeing and achieving simple operations, complete separation, stability and reliability and a blowback self-cleaning. The invention has a broad application prospect and practical significance in fundamentally addressing generation and emission of pol-
(Continued)

lutants in the textile printing and dyeing industry and realizing energy conservation, consumption reduction, emission reduction and clean production.

10 Claims, 1 Drawing Sheet

(51) Int. Cl.
| | |
|---|---|
| D06P 1/94 | (2006.01) |
| D06B 23/14 | (2006.01) |
| D06B 23/30 | (2006.01) |
| D06B 9/02 | (2006.01) |
| D06B 9/06 | (2006.01) |
| D06B 19/00 | (2006.01) |
| B01D 46/00 | (2006.01) |
| B01D 46/54 | (2006.01) |

(52) U.S. Cl.
CPC ............... *D06B 9/02* (2013.01); *D06B 9/06* (2013.01); *D06B 19/00* (2013.01); *D06B 23/14* (2013.01); *D06B 23/30* (2013.01); *D06P 1/81* (2013.01); *D06P 1/94* (2013.01); *D06B 2700/10* (2013.01); *D06B 2700/36* (2013.01)

(58) Field of Classification Search
CPC ............ D06B 2700/10; D06B 2700/36; B06D 46/0068; B06D 46/54; D06P 1/94
See application file for complete search history.

(56) References Cited

U.S. PATENT DOCUMENTS

| | | | | |
|---|---|---|---|---|
| 5,938,794 | A * | 8/1999 | Eggers | D06B 5/16 8/475 |
| 5,953,780 | A * | 9/1999 | Schollmeyer | D06B 5/12 8/158 |
| 6,129,451 | A * | 10/2000 | Rosio | B08B 7/0021 366/173.2 |
| 6,397,421 | B1 * | 6/2002 | Brainard | D06F 43/007 68/18 R |
| 2002/0108183 | A1 * | 8/2002 | Smith | D06B 19/00 8/115.51 |
| 2018/0094373 | A1 * | 4/2018 | Long | D06B 9/02 |

* cited by examiner

SEPARATION, RECYCLING AND SELF-CLEANING SYSTEM OF SUPERCRITICAL FLUID DYEING MACHINE

This application is a national stage application of PCT/CN2016/085186, filed on Jun. 8, 2016, which claims the priority to Chinese Patent Application No. 201610368949.6, filed on May 30, 2016, all of which are incorporated herein by reference in their entirety.

FIELD OF THE INVENTION

The present invention relates to the field of manufacturing technologies of a pressure vessel and a textile dyeing and finishing facility, and more particularly to a separation, recycling and self-cleaning system of a supercritical fluid dyeing machine.

DESCRIPTION OF THE RELATED ART

The supercritical $CO_2$ fluid can replace the conventional water bath to perform processing such as dyeing or finishing after dyeing on textiles, so that the issues such as high water consumption, high energy consumption, and severe environmental pollution caused by the conventional water bath processing can be thoroughly solved fundamentally. Therefore, to vigorously develop the waterless dyeing and finishing technology represented by the supercritical $CO_2$ fluid, and equipment systems thereof is of great realistic and strategic significance for healthy and sustainable development of the industry, protection of ecological environment, and so on.

In recent years, with the increasingly higher requirement on environmental protection and the enhanced implementation of environmental protection policies, the supercritical $CO_2$ waterless dyeing and finishing technology for textiles has got attention and recognition in the industry and entered the phase of commercialization, and the corresponding applicable equipment systems are also greatly developed. A separation and recycling system of a supercritical fluid dyeing machine is an indispensable component of the whole dyeing machine. The separation and recycling effect and efficiency of the separation and recycling system will directly affect the production and processing efficiency of the waterless dyeing machine, and the degree of separation and purification of the separation and recycling system for the residual dye in the medium also will directly affect the recycling of the medium, the rate of certified products, as well as the production costs. Therefore, an efficient, reliable, and applicable separation and recycling system plays a critical role in the application, promotion, and industrialization of the supercritical fluid dyeing machine and the waterless dyeing technology.

Chinese Invention Patent No. CN101760914A and entitled "Supercritical Dyeing Machine" discloses a rope-shaped fabric piece dyeing machine comprising a dyeing circulation system, a cloth feeding system, a separation and recycling system and the like, achieving loose and tension-free waterless dyeing processing for the fabric.

However, in the separation and recycling system of the supercritical fluid dyeing machine as disclosed above or other similar separation and recycling systems, generally a primary and/or secondary separate vessel body is designed in downstream of a stationary dyeing unit, to expand the dyeing medium under reduced pressure, so that the residual dye is separated out. However, such a separation system is generally only used for a stationary supporting dyeing unit thereof, and cannot realize separation and recycling for a mobile dyeing unit or multiple separate dyeing units, thus having low separation efficiency. Furthermore, in the existing separation and recycling system of the supercritical fluid dyeing machine, dye powders separated out under reduced pressure have small density and light weight and are easily carried by a flowing gas medium, and thus the separation effect is low, and pollution to a condenser, a medium reservoir and a clean medium is caused. Moreover, the separation and recycling system cannot achieve automatic reverse cleaning. Therefore, such separation and recycling systems are extremely unreliable and less efficient, such that the separation and recycling procedure after dyeing is complex, and more importantly, pollution of the recycled medium is easily caused, thereby increasing the dyelot chromatism of subsequent products, making the reproducibility hard to control, and also greatly affecting the industrial promotion of the waterless dyeing technology.

SUMMARY OF THE INVENTION

In order to solve the above technical problems, one object of the present invention is to provide a separation, recycling and self-cleaning system of a supercritical fluid dyeing machine, to achieve simultaneous separation and recycling for multiple separate dyeing units of the supercritical fluid dyeing machine, and achieve the advantages such as high efficiency, simple operations, complete separation, being stable and reliable, a blowback self-cleaning capability, as well as a wide application range.

For the above purposes, the invention provides a separation, recycling and self-cleaning system of a supercritical fluid dyeing machine. The system comprises a supercritical fluid medium reservoir, one or more parallel dyeing units, a high-pressure pump, a primary separator, a secondary separator, and a membrane separator, which are sequentially connected by a high-pressure pipe along a medium forward direction. When an inlet of the high-pressure pump is in communication with the dyeing unit and the inlet of the high-pressure pump is connected to the membrane separator by a high-pressure loop, the high-pressure pump, the primary separator, the secondary separator, the membrane separator and the high-pressure loop form a first loop for depressurization of the dyeing unit and the membrane separator.

When the inlet of the high-pressure pump is disconnected from the dyeing unit, the high-pressure pump, the primary separator, the secondary separator, the membrane separator and the high-pressure loop form a second loop for blowback self-cleaning of the high-pressure pump, the primary separator, the secondary separator and the high-pressure loop;

The high-pressure pump, the primary separator, the secondary separator and the membrane separator form a third loop for stage-by-stage separation under reduced pressure and recycling of residual dye and a fluid/gas medium in the dyeing unit.

The supercritical fluid medium reservoir, the membrane separator, the high-pressure loop and the high-pressure pump form a fourth loop for blowback self-cleaning of the membrane separator.

Preferably, a sintered filter plate, a filter cartridge, and a tapered sintered filter plate are sequentially disposed in the membrane separator.

Preferably, each of the dyeing units and the supercritical fluid medium reservoir are connected to a medium filling and boosting system. The medium filling and boosting system comprises a medium filter, a booster pump, a supercritical fluid high-pressure mass flowmeter and a high-pressure ball valve which are sequentially connected, and the supercritical fluid high-pressure mass flowmeter is further connected to the booster pump in a coordinated control manner. The start and stop of the booster pump is controlled by coordinated control signals for measurement and transmission of the mass, density and temperature of a passing supercritical fluid, and for presetting of a required fluid mass.

Preferably, the sintered filter plate, the filter cartridge, and the tapered sintered filter plate have a filtration accuracy of 0.01 to 0.10 μm.

Preferably, the supercritical fluid medium reservoir has a medium inlet and a medium outlet. The medium outlet is connected with the medium filter, the medium inlet is connected with a gas source, and the gas source passes through the high-pressure pipe and a stop valve, and enters the medium inlet after being treated by a condenser.

Preferably, the membrane separator is connected to the condenser by a stop valve.

Preferably, stop valves are disposed between the medium outlet and the medium filter, between the dyeing unit and the high-pressure pump, between the high-pressure pump and the primary separator, between the primary separator and the secondary separator, between the secondary separator and the membrane separator, between the condenser and the supercritical fluid medium reservoir, and at a lower end of the supercritical fluid medium reservoir, a lower end of the primary separator, a lower end of the secondary separator and a lower end of the membrane separator respectively.

Preferably, the dyeing unit is a stationary high-pressure dye vat or a mobile high-pressure treatment container.

Preferably, the medium inlet is disposed at a distance of 0 to 10 cm from the top of the supercritical fluid medium reservoir, and the medium outlet is disposed at a distance of 5 to 50 cm from the bottom of the supercritical fluid medium reservoir.

Preferably, the stop valve for introducing the gas source and the stop valve connected to the membrane separator are connected with the condenser by a high-pressure three-way pipe.

By means of the above technical solution, as compared with the prior art, the present invention has the following advantages:

1. Two stages of separators and a membrane separation system are employed, so that the dyeing medium and residual dye in multiple or selected separate dyeing units can be efficiently separated and recycled simultaneously, and the fluid medium in the dyeing unit can be recycled to the maximum degree. Also, the pressure in the dyeing unit after recycling is the same as the external atmospheric pressure, and thus each dyeing unit can be opened directly.

2. In the invention, a medium filling and boosting system may be combined with the waterless dyeing machine, such that each dyeing unit after dyeing is cleaned by using the clean fluid medium in the supercritical fluid medium reservoir.

3. By means of the blowback self-cleaning function, the high-pressure pump, the primary separator, the secondary separator, the membrane separator and the high-pressure loop can be self-cleaned, thereby overcoming the defects of the conventional separation system and the method thereof, such as low separation and use efficiency, a poor separation effect, low reliability, complicated separation and recycling process, as well as difficulty in cleaning. Therefore, the invention can significantly improve the production and processing efficiency of supercritical fluid waterless dyeing, can achieve the advantages such as high efficiency, simple operations, complete separation, being stable and reliable, a blowback self-cleaning capability and a wide application range, and has a broad application prospect and practical significance in fundamentally addressing generation and emission of pollutants of the textile printing and dyeing, and realizing energy conservation, consumption reduction, emission reduction, and clean production of the textile printing and dyeing industry.

Figure 1:
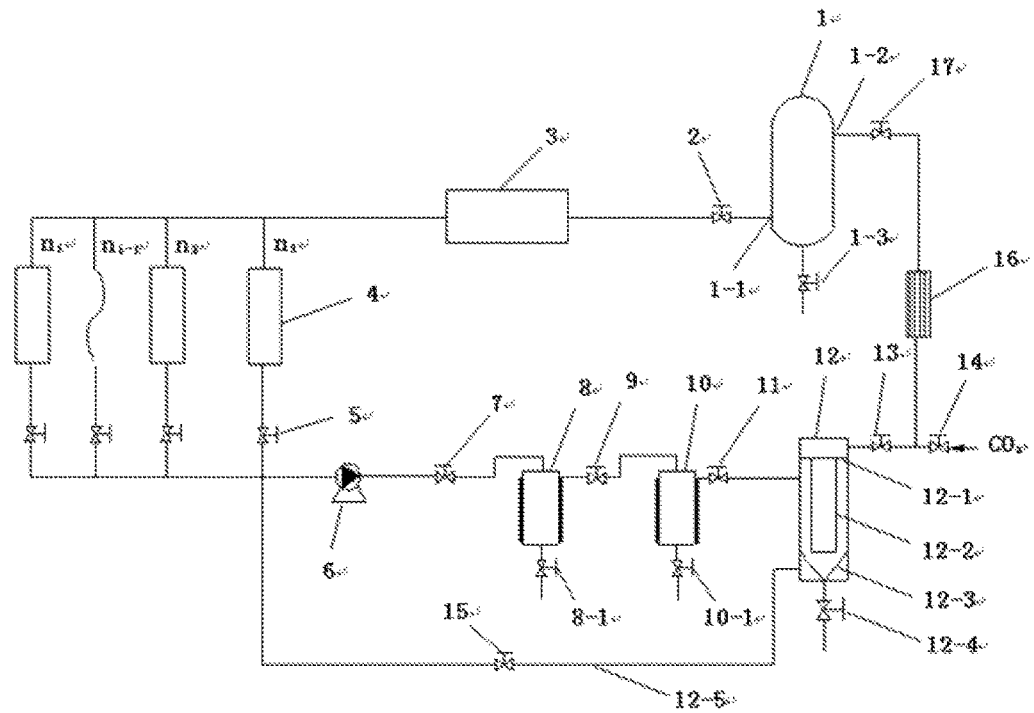
FIG. 1 is a schematic diagram showing the working principle of a separation and recycling system of a supercritical fluid dyeing machine according to an embodiment of the present invention.

In the drawings: 1. supercritical fluid medium reservoir; 1-1. medium outlet; 1-2. medium inlet; (1-3, 2, 5, 7, 8-1, 9, 10-1, 11, 12-4, 13, 14, 15, 17). stop valves; 3. medium filling and boosting system; 3-1. medium filter; 3-2. booster pump; 3-3. supercritical fluid high-pressure mass flowmeter; 3-4. high-pressure ball valve; 4. dyeing unit; 6. high-pressure pump; 8. primary separator; 10. secondary separator; 12. membrane separator; 12-1. sintered filter plate in the membrane separator; 12-2. filter cartridge in the membrane separator; 12-3. tapered sintered filter plate in the membrane separator; 12-5. high-pressure loop, 16. condenser; and ($n_1$, $n_2$, . . . , $n_{i-1}$, $n_i$, i≥1): dyeing units connected in parallel and independent of each other.

DETAILED DESCRIPTION OF THE PREFERRED EMBODIMENTS

The invention will be further illustrated in more detail with reference to the accompanying drawings and embodiments. It is noted that, the following embodiments only are intended for purposes of illustration, but are not intended to limit the scope of the present invention.

Figure 2:
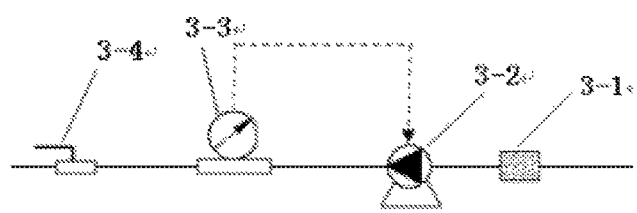
FIG. 2 is a block diagram showing the principle of a medium filling and boosting system in the present invention.

Referring to FIG. 1 and FIG. 2, a separation and recycling and self-cleaning system of a supercritical fluid dyeing machine in a preferred embodiment of the present invention includes a high-pressure pump 6, a primary separator 8, a secondary separator 10, a membrane separator 12, a condenser 16, a supercritical fluid medium reservoir 1, and dyeing units $n_1$, $n_2$, . . . , $n_{i-1}$, $n_i$ (i≥1) independent of each other.

When the inlet of the high-pressure pump 6 is in communication with the dyeing unit 4, and the inlet of the high-pressure pump 6 is connected to the membrane separator 12 by a high-pressure loop 12-5, the high-pressure pump 6, the primary separator 8, the secondary separator 10, the membrane separator 12 and the high-pressure loop 12-5 form a first loop for depressurization of the dyeing unit 4 and the membrane separator 12.

When the inlet of the high-pressure pump 6 is disconnected from the dyeing unit 4, the high-pressure pump 6, the primary separator 8, the secondary separator 10, the membrane separator 12, and the high-pressure loop 12-5 form a second loop for blowback self-cleaning of the high-pressure pump 6, the primary separator 8, the secondary separator 10 and the high-pressure loop 12-5.

The high-pressure pump 6, the primary separator 8, the secondary separator 10, and the membrane separator 12 form a third loop for stage-by-stage separation under reduced pressure and recycling of residual dye and a fluid/gas medium in the dyeing unit 4.

The supercritical fluid medium reservoir 1, the membrane separator 12, the high-pressure loop 12-5 and the high-pressure pump 6 form a fourth loop for blowback self-cleaning of the membrane separator 12.

Specifically, in the first loop, the high-pressure pump 6 is connected to a stop valve 7 and the primary separator 8 by the high-pressure pipe in an outlet direction thereof, and also is connected to the dyeing units $n_1, n_2, \ldots, n_{i-1}, n_i$ ($i \geq 1$) independent of each other in an inlet direction thereof, and connected with the membrane separator 12 by the high-pressure loop 12-5. In this way, the medium in each independent dyeing unit and the membrane separator 12 can be depressurized and pumped.

In the second loop, by disconnecting the high-pressure pump 6 from the dyeing unit 4 and opening the high-pressure pump 6 as well as stop valves 7, 9, 11, and 15, the high-pressure pump 6, the primary separator 8, the secondary separator 10 and the high-pressure loop 12-5 can be self-cleaned.

In the third loop, the dyeing units $n_1, n_2, \ldots, n_{i-1}, n_i$ ($i \geq 1$) independent of each other are connected to the high-pressure pump 6 by the high-pressure pipe and stop valves 5 respectively, so as to be connected in series (i=1) to the high-pressure pump 6 or connected to the high-pressure pump 6 after being connected in parallel (i≥2), where the fluid medium containing residual dye passes through the primary separator 8, the secondary separator 10 and the membrane separator 12 to achieve the separation and recycling.

In the fourth loop, under the conditions that each dyeing unit is disconnected from the high-pressure pump 6, the stop valve 11 is closed, and stop valves 13 and 15 are opened, the high-pressure pump 6 is started such that efficient blowback self-cleaning can be performed on the membrane separator system 12 by using the clean medium in the supercritical fluid medium reservoir 1. In this way, the membrane separator system can be used continuously and the separated dye can be efficiently recycled.

The inlet of the primary separator 8 is connected to the high-pressure pump 6 by the high-pressure pipe, and the outlet of the primary separator 8 is sequentially connected to the stop valve 9 and the inlet of the secondary separator 10, and also, the outlet of the secondary separator 10 is connected to the membrane separator 12, thereby achieving stage-by-stage separation under reduced pressure for the residual dye and fluid/gas medium in each dyeing unit, and recycling the residual dye and fluid/gas medium by a stop valve 8-1 at the lower end of the primary separator 8 and a stop valve 10-1 at the lower end of the secondary separator 10 respectively.

A sintered filter plate 12-1, a filter cartridge 12-2 and a tapered sintered filter plate 12-3 are sequentially disposed in the membrane separator 12. A stop valve 12-4 is disposed at a discharge outlet of the membrane separator 12, and the membrane separator 12 is connected with the high-pressure pump 6 by the high-pressure loop 12-5, such that the further separation and purification of the fluid or gas medium treated by the primary separator 8 and the secondary separator 10 is achieved. The residual dye carried in the medium is separated under the action of the sintered filter plate 12-1, the filter cartridge 12-2 and the tapered sintered filter plate 12-3, and is gathered at the bottom of the membrane separator 12 and recycled by the stop valve 12-4 at the discharge outlet. Furthermore, under the conditions that each dyeing unit is disconnected from the high-pressure pump 6, the stop valve 11 is closed and the stop valves 13, 15 are opened, the high-pressure pump 6 may be started to perform blowback self-cleaning on the membrane separator 12 by using the clean medium in the supercritical fluid medium reservoir 1.

The sintered filter plate 12-1, the filter cartridge 12-2, and the tapered sintered filter plate 12-3 in the membrane separator 12 have a filtration accuracy of 0.01 to 0.10 μm respectively, so that powders in the residual dye can be completely filtered away.

The dyeing units $n_1, n_2, \ldots, n_{i-1}, n_i$ ($i \geq 1$) independent of each other may be boosted multiple times by using a medium filling and boosting system 3, and each dyeing unit and products after dyeing can be cleaned by using the clean fluid medium in the supercritical fluid medium reservoir 1.

Specifically, the medium filling and boosting system 3 includes a medium filter 3-1, a booster pump 3-2, a supercritical fluid high-pressure mass flowmeter 3-3 and a high-pressure ball valve 3-4 which are sequentially connected. The supercritical fluid high-pressure mass flowmeter 3-3 is further connected to the booster pump 3-2 in a coordinated control manner, to control the start and stop of the booster pump 3-2 by using a coordinated control signal. The supercritical fluid high-pressure mass flowmeter 3-3 is in communication with the high-pressure ball valve 3-4 by the high-pressure pipe at a fluid outlet, and is in communication with the booster pump 3-2 by the high-pressure pipe at a fluid inlet, so that the mass, density and temperature of the supercritical fluid can be directly measured and displayed, and a required fluid mass can be preset, thereby achieving the coordinated control on start/stop of the booster pump 3-2 by using the coordinated control signal of the supercritical fluid high-pressure mass flowmeter 3-3 and the booster pump 3-2, to achieve quantitative mass filling of each dyeing unit 4 with the supercritical fluid medium. By the high-pressure pipe, one end of the high-pressure ball valve 3-4 is connected to each dyeing unit 4, and the other end is connected to the supercritical fluid high-pressure mass flowmeter 3-3. By opening the high-pressure ball valve 3-4, the medium filling and boosting system is communicated with the dyeing unit 4, so that the dyeing unit 4 is quantitatively filled with the required dyeing medium. The booster pump 3-2 may be a gas or liquid booster pump, a high-pressure plunger pump, or a diaphragm pump, where the outlet of the booster pump 3-2 is in communication with the supercritical fluid high-pressure mass flowmeter 3-3 by the high-pressure pipe, and the start/stop and flow of the booster pump 3-2 are controlled by a coordinated control signal output by the forward (downstream) supercritical fluid high-pressure mass flowmeter 3-3, to achieve quantitative filling for the dyeing unit 4. The inlet of the booster pump 3-2 is in communication with the medium filter 3-1, to implement and ensure purification treatment for the filling medium.

The supercritical fluid medium reservoir 1 is provided with a medium outlet 1-1 and a medium inlet 1-2, where the medium inlet 1-2 is disposed at an appropriate position from the top of the supercritical fluid medium reservoir 1, and is sequentially connected to the stop valve 17 and the condenser 16 by the high-pressure pipe, so that the medium can be cooled and stored. The medium inlet 1-2 is disposed at a suitable position from the top of the supercritical fluid medium reservoir 1, and this means that the medium inlet 1-2 is disposed at a distance of 0 to 10 cm from the top of the supercritical fluid medium reservoir 1. The medium outlet 1-1 is disposed at a distance of 5 to 50 cm from the bottom of the supercritical fluid medium reservoir 1. The medium outlet 1-1 is connected to the medium filter 3-1, the medium inlet 1-2 is connected to the gas source, and the gas source enters the medium inlet 1-2 after passing through the high-pressure pipe and the stop valve 14 and being treated by the condenser 16.

Specifically, the stop valve 14 for introducing the gas source and the stop valve 13 connected to the membrane separator 12 are connected to the condenser 16 by a high-pressure three-way pipe.

After the dyeing units $n_1, n_2, \ldots, n_{i-1}, n_i$ (i≥1) independent of each other are cleaned, under the action of the high-pressure pump 6, pumping is stopped when the pressure of the medium in each dyeing unit is equal to $1.01 \times 10^5$ Pa, such that the pressure of each dyeing unit is equal to the atmospheric pressure, and each dyeing unit can be directly opened.

The dyeing units $n_1, n_2, \ldots, n_{i-1}, n_i$ (i≥1) independent of each other may be various stationary high-pressure dye vats of different forms, different shapes and different volumes, or may be mobile high-pressure treatment containers for textile dyeing, pre-treatment or after-treatment.

When the separation and recycling and self-cleaning system of a supercritical fluid dyeing machine according to the invention operates, the dyeing unit 4 or the multiple dyeing units $n_1, n_2, \ldots, n_{i-1}, n_i$ (i≥1) independent of each other, for which the separation and recycling need to be performed, are first communicated with the high-pressure pump 6 by the high-pressure pipe as shown in FIG. 1, and are connected to the high-pressure pump 6 after being connected in series (i=1) or connected in parallel (i≥2). Then, the stop valves 7, 9, 11 and 13 are opened, and the stop valves 8-1, 10-1, 12-4 and 15 are closed. Finally, the high-pressure pump 6 is started to perform separation and recycling for the dyeing medium and residual dye in the dyeing unit 4 or multiple dyeing units $n_1, n_2, \ldots, n_{i-1}, n_i$ (i≥1) independent of each other. Furthermore, the medium filling and boosting system 3 may boost the dyeing unit 4 or multiple dyeing units $n_1, n_2, \ldots, n_{i-1}, n_i$ (i≥1) independent of each other multiple times, and the unfixed dye in the dyeing unit and the dyeing product are cleaned by using the clean fluid medium in the supercritical fluid medium reservoir 1, and continuous separation and recycling is performed by using the third loop where the high-pressure pump 6 is located.

For stationary dyeing units, after the dyeing is finished, cleaning as well as separation and recycling treatment can be directly performed on each dyeing unit according to the above-mentioned process. For a mobile dyeing unit, the treatment may be performed after the dyeing unit is connected to the filling and boosting system 3. Furthermore, after the cleaning and the separation are finished, each dyeing unit is disconnected from the medium filling and boosting system 3, and under the action of the high-pressure pump 6, pumping is stopped when the pressure of the medium in each dyeing unit is equal to $1.01 \times 10^5$ Pa, so that the pressure of each dyeing unit is balanced with the atmospheric pressure, and therefore, each dyeing unit can be directly opened and the dyeing medium can be recycled to the maximum degree.

In addition, under the conditions that each dyeing unit is disconnected from the high-pressure pump 6, the stop valve 11 is closed and the stop valves 13 and 15 are opened, the high-pressure pump 6 is started and efficient blowback self-cleaning can be performed on the membrane separator system 12 by using the clean medium in the supercritical fluid medium reservoir 1. In this way, the membrane separator system can be used continuously and the separated dye can be efficiently recycled.

When the separation and recycling system needs to be cleaned, for example, when color for dyeing needs to be changed, each dyeing unit may be disconnected, and residual dye in the high-pressure pump 6, the primary separator 8, the secondary separator 10 and the high-pressure loop 12-5 can be cleaned continuously or for multiple times by using a blowback self-cleaning loop consisting of the high-pressure pump 6, the primary separator 8, the secondary separator 10, the membrane separator system 12, the high-pressure loop 12-5 and the stop valves 7, 9, 11, and 15 in the separation and recycling system, and can be recycled through a discharge outlet controlled by the stop valves 8-1 and 10-1 at the lower ends of the primary separator 8 and the secondary separator 10 respectively, and/or recycled through a discharge outlet controlled by the stop valve 12-4 at the lower end of the membrane separator 12.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A separation, recycling and self-cleaning system of a supercritical fluid dyeing machine, comprising:
    a supercritical fluid medium reservoir, one or more parallel dyeing units, a high-pressure pump, a primary separator, a secondary separator, and a membrane separator, which are sequentially connected by a high-pressure pipe along a medium forward direction, wherein
    when an inlet of the high-pressure pump is in communication with the dyeing unit and the inlet of the high-pressure pump is connected to the membrane separator by a high-pressure loop, the high-pressure pump, the primary separator, the secondary separator, the membrane separator and the high-pressure loop form a first loop for depressurization of the dyeing unit and the membrane separator;
    when the inlet of the high-pressure pump is disconnected from the dyeing unit, the high-pressure pump, the primary separator, the secondary separator, the membrane separator and the high-pressure loop form a second loop for blowback self-cleaning of the high-pressure pump, the primary separator, the secondary separator and the high-pressure loop;
    the high-pressure pump, the primary separator, the secondary separator and the membrane separator forming a third loop for stage-by-stage separation under reduced pressure and recycling of residual dye and a fluid/gas medium in the dyeing unit; and
    the supercritical fluid medium reservoir, the membrane separator, the high-pressure loop and the high-pressure pump forming a fourth loop for blowback self-cleaning of the membrane separator.

2. The separation, recycling and self-cleaning system of a supercritical fluid dyeing machine as claimed in claim 1, wherein a sintered filter plate, a filter cartridge, and a tapered sintered filter plate are sequentially disposed in the membrane separator.

3. The separation, recycling and self-cleaning system of a supercritical fluid dyeing machine as claimed in claim 1, wherein each of the dyeing units and the supercritical fluid medium reservoir are connected to a medium filling and boosting system, the medium filling and boosting system comprising a medium filter, a booster pump, a supercritical fluid high-pressure mass flowmeter and a high-pressure ball valve which are sequentially connected, and the supercritical fluid high-pressure mass flowmeter being further connected to the booster pump in a coordinated control manner, and the start and stop of the booster pump being controlled by coordinated control signals for measurement and transmission of the mass, density and temperature of a passing supercritical fluid, and for presetting of a required fluid mass.

4. The separation, recycling and self-cleaning system of a supercritical fluid dyeing machine as claimed in claim 2, wherein the sintered filter plate, the filter cartridge, and the tapered sintered filter plate have a filtration accuracy of 0.01 to 0.10 μm.

5. The separation, recycling and self-cleaning system of a supercritical fluid dyeing machine as claimed in claim 3, wherein the supercritical fluid medium reservoir has a medium inlet and a medium outlet, the medium outlet being connected with the medium filter, the medium inlet being connected with a gas source, and the gas source passing through the high-pressure pipe and a stop valve, and entering the medium inlet after being treated by a condenser.

6. The separation, recycling and self-cleaning system of a supercritical fluid dyeing machine as claimed in claim 5, wherein the membrane separator is connected to the condenser by a stop valve.

7. The separation, recycling and self-cleaning system of a supercritical fluid dyeing machine as claimed in claim 6, wherein stop valves are disposed between the medium outlet and the medium filter, between the dyeing unit and the high-pressure pump, between the high-pressure pump and the primary separator, between the primary separator and the secondary separator, between the secondary separator and the membrane separator, between the condenser and the supercritical fluid medium reservoir, and at a lower end of the supercritical fluid medium reservoir, a lower end of the primary separator, a lower end of the secondary separator and a lower end of the membrane separator respectively.

8. The separation, recycling and self-cleaning system of a supercritical fluid dyeing machine as claimed in claim 7, wherein the dyeing unit is a stationary high-pressure dye vat or a mobile high-pressure treatment container.

9. The separation, recycling and self-cleaning system of a supercritical fluid dyeing machine as claimed in claim 7, wherein the medium inlet is disposed at a distance of 0 to 10 cm from the top of the supercritical fluid medium reservoir, and the medium outlet is disposed at a distance of 5 to 50 cm from the bottom of the supercritical fluid medium reservoir.

10. The separation and recycling and self-cleaning system of a supercritical fluid dyeing machine as claimed in claim 6, wherein the stop valve for introducing the gas source and the stop valve connected to the membrane separator are connected with the condenser by a high-pressure three-way pipe.

* * * * *